June 13, 1939.  W. BEUERMANN  2,162,239
ELECTRIC INDICATING DEVICE
Filed March 10, 1937
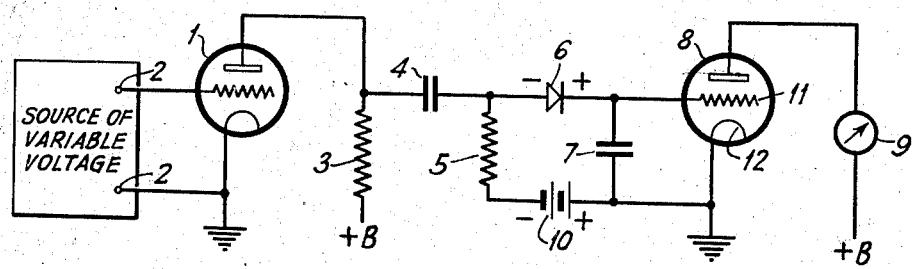
INVENTOR
W. BEUERMANN
BY
ATTORNEY Patented June 13, 1939

2,162,239

UNITED STATES PATENT OFFICE 2,162,239

ELECTRIC INDICATING DEVICE

Wilhelm Beuermann, Berlin, Germany, assignor to Telefunken Gesellschaft fur Drahtlose Telegraphie m. b. H., Berlin, Germany, a corporation of Germany Application March 10, 1937, Serial No. 130,007
In Germany March 23, 1936

2 Claims. (Cl. 175—183)

If electric oscillations of a frequency below audibility are to be indicated or registered they must first be rectified. When the variations of the rectified current are not to be rendered visible in the indicating instrument, but only an average value is to be indicated therein, a measuring instrument with very great inertia may be used. Measuring instruments of this type are however mechanically very sensitive. Another possibility consists in connecting a filter member between the rectifier and the indicating arrangement or the relay which for instance releases a signal. But since indicating instruments or relays have a relatively small resistance, the condenser of the filter member must have extraordinarily large capacity so that the condenser will not discharge through the relay resistance after each impulse of the rectified voltage. The condenser must in that case have such large dimensions that its size is out of proportion to the weight and input of the other circuit elements.

Hence, it is proposed in accordance with the invention to connect the indicating device (or the relay) in the anode circuit of a tube to whose grid is connected a condenser which is charged through a rectifier by the oscillations, and it is further proposed that the discharge time constant of the condenser and the blocking resistance of the rectifier be made large in comparison to the period of the impressed oscillations.

An example of an embodiment consists for instance in the indication of slow sound intensity variations of a note. Current of the tonal frequency is rectified for this purpose and the tonal frequency component is removed by filtering from the rectified current with the result that there remains solely the slow frequency of the sound intensity variations. This slow frequency is then indicated by the arrangement according to the invention.

The invention will be explained in more detail in what follows with aid of the drawing which is a schematic circuit diagram of a preferred embodiment thereof.

The tonal variations are impressed on the input terminals 2 of an electron discharge tube 1 which has a high resistance 3 in the circuit connecting its plate with the source of B voltage. The upper end of 3 is coupled to the grid of a succeeding tube 8 through a condenser 4 and a rectifier 6, which is preferably of the dry, for example the oxide, type. The rectifier 6, a resistor 5 and a bias battery 10 form a series circuit conductive to direct current between the grid 11 and cathode 12 of the tube 8. The grid 11 and cathode 12 are also connected by a circuit including a condenser 7. The slow variations to be measured are detected and amplified in tube 8 and indicated on a suitable measuring instrument or meter 9 connected in the anode circuit of tube 8.

In operation the voltage variations, as amplified by tube 1, appear across the ends of resistor 5 and charge the condenser 7 positively through rectifier 6. If these charging impulses are applied to 7 so frequently that it cannot discharge in the intervals between them, the potential at the grid 11 will rise with each applied impulse, and as the tube may be connected as an anode rectifier until the relay responds and a limiting of the potential takes place, for example, by the flow of grid current.

The advantage of the invention, to be able to use a relatively small condenser 7 is insured by arranging that the direct output of the rectifier consists of the grid-cathode path of a tube, 8, which path has a very high resistance. Accordingly, condenser 7 practically cannot discharge over this path but only through the blocking resistance of rectifier 6 and resistor 5, no special resistance being required for the discharge of the condenser. I have found the following circuit values to be effective for the intended purpose in the circuit arrangement shown.

Resistor 3=10,000 ohms
Resistor 5=1 megohm
Condenser 4=2 microfarads
Condenser 7=0.5 microfarad The circuit described has the further advantage that the relay will not respond to any interfering crackle since for response several periodical voltage impulses or oscillations are required which will cause the potential at the condenser to rise gradually to a final value. With the values given, the time constant of discharge of condenser 7 and the blocking resistance of rectifier 6 is much larger than the period of the impressed oscillations.

Having described my invention, what I claim and desire to secure by Letters Patent is:

1. Detecting and indicating means comprising an electron discharge tube having a cathode, a control grid and an anode; a diode detector, a resistor and a steady source of potential connected in series between said control grid and cathode to provide a circuit conductive to direct current between said grid and cathode, said steady source of potential being poled in said circuit so as to maintain the grid normally negative with respect to the cathode whereby the grid to cathode impedance of the tube is made high, a condenser connected between the control electrode and cathode, an anode circuit for said tube including an indicating device, and means for impressing voltage oscillations which vary at a frequency below audibility across said resistor.

2. Means for indicating voltage variations comprising an electron discharge tube having an anode, a cathode and a grid electrode; a rectifier, a resistor and a steady source of potential connected in series between said grid electrode and cathode, said steady source of potential being poled in said series circuit so as to render the grid electrode normally negative with respect to the cathode to thereby provide a high impedance grid to cathode path in said tube, a condenser connected between the grid electrode and cathode, an anode circuit for said tube including an indicating device and means for impressing the voltage variations to be measured across said resistor, said resistor and condenser being proportioned so that the discharge time constant thereof is large as compared to the period of the impressed oscillations.

WILHELM BEUERMANN.